(12) United States Patent
Faust

(10) Patent No.: US 7,437,184 B2
(45) Date of Patent: Oct. 14, 2008

(54) INPUT DEVICE, ESPECIALLY FOR A MOBILE TELEPHONE, MODULE COMPRISING AN INPUT DEVICE, MOBILE TELEPHONE AND METHOD FOR THE PRODUCTION THEREOF

(75) Inventor: Bernhard Faust, Rosenheim (DE)

(73) Assignee: Palm, Inc., Sunnyvale, CA (US)

( * ) Notice: Subject to any disclaimer, the term of this patent is extended or adjusted under 35 U.S.C. 154(b) by 239 days.

(21) Appl. No.: 10/538,930

(22) PCT Filed: Dec. 5, 2003

(86) PCT No.: PCT/DE03/04008

§ 371 (c)(1),
(2), (4) Date: Jun. 13, 2005

(87) PCT Pub. No.: WO2004/054212

PCT Pub. Date: Jun. 24, 2004

(65) Prior Publication Data

US 2006/0126825 A1   Jun. 15, 2006

(30) Foreign Application Priority Data

Dec. 12, 2002   (DE) .................................. 102 58 209

(51) Int. Cl.
*H04M 1/00* (2006.01)
(52) U.S. Cl. .............. 455/575.1; 455/575.8; 455/550.1; 455/90.3; 379/368; 379/433.07

(58) Field of Classification Search .............. 455/550.1, 455/575.1, 347, 575.3, 575, 3, 575.8, 186.2, 455/90.3, 425, 426, 456.5, 456.6, 435; 379/368, 379/433.07, 433.06, 428.01, 422, 369, 433.01; 200/5 R, 9, 314, 275, 412, 417, 510, 516, 200/237, 345, 512

See application file for complete search history.

(56) References Cited

U.S. PATENT DOCUMENTS 4,033,030 A * 7/1977 Robinson et al. .............. 29/622
4,074,118 A * 2/1978 Washizuka et al. .......... 708/190

(Continued)

FOREIGN PATENT DOCUMENTS

EP   0 367 204   5/1990

(Continued)

*Primary Examiner*—Edward Urban
*Assistant Examiner*—Charles Chow
(74) *Attorney, Agent, or Firm*—Bell, Boyd & Lloyd LLP

(57) ABSTRACT

The present disclosure relates to an input device, especially for a mobile telephone, a module comprising an input device and a method for the production of an input device and/or a module. An input device is provided, including, a module comprising an input device, a mobile telephone and a production method enabling improved permanent fixing of an input device to an/or inside a housing, whereby at mechanically stable fixing means is arranged between a first plane consisting of at least one cap and a second plane of a flexible carrier connected to the cap, such that the cap and the flexible carrier transmit force in a substantially punctual manner via a plane of a fixing means and the fixing means, in one area of at least one terminal edge, is configured in such a way it can secure the input device in or on a housing.

15 Claims, 2 Drawing Sheets

U.S. PATENT DOCUMENTS

| | | | | |
|---|---|---|---|---|
| 4,083,100 A * | 4/1978 | Flint et al. | | 29/622 |
| 4,400,596 A * | 8/1983 | Fukukura et al. | | 200/5 A |
| 4,499,343 A * | 2/1985 | Prioux et al. | | 200/5 A |
| 4,862,499 A * | 8/1989 | Jekot et al. | | 379/368 |
| 4,937,932 A * | 7/1990 | Ishii | | 29/622 |
| 5,613,599 A * | 3/1997 | Inagaki et al. | | 200/512 |
| 5,635,927 A * | 6/1997 | Lin | | 341/22 |
| 5,747,756 A * | 5/1998 | Boedecker | | 200/5 A |
| 5,898,147 A * | 4/1999 | Domzalski et al. | | 200/1 B |
| 5,917,906 A * | 6/1999 | Thornton | | 379/433.07 |
| 5,990,772 A * | 11/1999 | Van Zeeland | | 335/207 |
| 6,274,825 B1 * | 8/2001 | Aaltonen et al. | | 200/5 A |
| 6,571,457 B2 * | 6/2003 | Naritomi | | 29/622 |
| 6,639,159 B2 * | 10/2003 | Anzai | | 200/1 B |
| 6,911,608 B2 * | 6/2005 | Levy | | 200/5 A |
| 6,917,007 B2 * | 7/2005 | Hirai et al. | | 200/516 |
| 7,027,036 B2 * | 4/2006 | Yang | | 345/170 |
| 2001/0003539 A1 * | 6/2001 | Hahm et al. | | 379/368 |
| 2002/0032011 A1 * | 3/2002 | Park | | 455/90.3 |
| 2003/0044000 A1 * | 3/2003 | Kfoury et al. | | 379/433.04 |
| 2004/0085360 A1 * | 5/2004 | Pratt et al. | | 345/773 |

FOREIGN PATENT DOCUMENTS

| | | |
|---|---|---|
| EP | 1 156 643 | 11/2001 |
| EP | 1 187 155 | 3/2002 |
| GB | 1 405 043 | 9/1975 |

* cited by examiner

INPUT DEVICE, ESPECIALLY FOR A MOBILE TELEPHONE, MODULE COMPRISING AN INPUT DEVICE, MOBILE TELEPHONE AND METHOD FOR THE PRODUCTION THEREOF

FIELD OF TECHNOLOGY

The present disclosure relates to an input device, especially for a mobile telephone, a module comprising an input device, a mobile telephone and a method for the production of an input device, a module and/or a mobile telephone.

BACKGROUND

Design trends are increasingly at the fore in modern devices. As well as the visual impression made by a device, much importance is attached to constantly improving the ease of handling of the device concerned. At the same time, the miniaturization of portable electronic devices with inputting facilities is leading to devices with ever smaller surface areas and volumes, so advances in technological development, especially in mobile telephones, are leading to ever smaller devices overall. The design space available for keypads among other things is consequently becoming smaller and smaller, which can have a very detrimental effect on the user-friendliness of such devices.

A minimum volume of a keypad is determined by the following criteria: key surface area, key spacing and the projection of the keys relative to the housing, which projection influences the key height. The volume of keypads will be smallest where a respective key cap remains as flat as possible. The area of keypads will then be smallest where the key spacing approaches zero, i.e. the keys will no longer be separated from one another by housing support frames and will thus be individually held in a form-locking manner in the housing, as is known in PC keyboards.

Without restricting the scope of the invention to this application field, the embodiments disclosed below will be described in the context of mobile telephones and the input devices thereof, due to their small structural size, the heavy mechanical loading on them caused by dialing operations and especially by the sending of short written messages in the form of SMS messages, as well as to their being produced under very great cost pressures.

According to the prior art, input devices with keys are known, wherein the externally accessible caps of a user interface are each fitted on at least one side with a flange. The cap rests with at least one flange arranged against corresponding housing support frames in order to prevent it from falling or springing out. Without housing support frames, which are generally present between all the keys, such securing is possible only in an area of contact between keypad and housing or keypad and upper housing shell. In particular, the keys with the dial numbers 5 and 8 will thus in conventional mobile telephone keypads no longer be adequately secured to prevent the entire keypad, held in the housing without any support frames, from sliding out or being torn out.

In a known input device with individual keys not having support frames, the keys are fastened onto a flexible plastic carrier. The flexible plastic carrier must for its part be firstly mechanically very stable in order to secure the input device in the housing and/or to act as a backing system and secondly also highly flexible in order to ensure operability of the individual keys. These requirements are so conflicting that a workable compromise can only be found to a highly restricted degree. With housing dimensions continuing to shrink, long-term functional reliability is no longer guaranteed.

From EP 1 156 643 A2, a keypad for a mobile telephone is known, in which the keypad caps, not separated from one another by housing support frames, are fixed on a flexible, film-type carrier. The film carrier is fashioned for example as a silicon carrier. In one embodiment, the film carrier itself is bonded to a printed circuit board which for its part is held in an overlapping area in a form-locking manner by a surrounding housing by virtue of the fact that the film carrier has a circumferential flange. Accordingly, the result is a generally frame-like area of overlap between the flange and for example an upper housing shell in which the keypad is enclosed via combinations of hooks and eyes and/or pins and holes, held in a form-locking or force-locking manner and thereby fixed.

As a result of the miniaturization of devices overall, however, an overlapping area of contact between a respective keypad and a housing is becoming smaller and smaller, so as to ensure, without any further shrinkage in key size, a minimum degree of convenience of use and input reliability. Mechanical securing of a keypad or of a keypad module relative to a housing in the known form of interlocking by means of combinations of recesses or undercuts with corresponding support frames, hooks and/or studs is then no longer adequate. Simple and, in production engineering terms, readily implementable bonding of a keypad or keypad module to an upper shell for lasting protection of the keys to prevent the keys or the keypad carrier together with all the keys from falling or springing out has also proven inadequate.

As a result, a large amount of design space is needed in an area around the input device or the keypad of a mobile telephone which could better be used to increase user-friendliness by relatively increasing the size of the individual keys. The only alternative is to change the design to comply with currently technically implementable forms, for example to enlarge the housing solely in order to fix the keypad securely. In this way, however, the overall device would have a housing that was larger than was actually technically necessary. This approach to a solution would, however, stand in the way of miniaturization.

BRIEF SUMMARY

The exemplary embodiments discussed below disclose an input device, a module comprising an input device, a mobile telephone and a production method which enable improved permanent fixing of an input device to and/or inside a housing.

Under one such embodiment an input device such as a mobile telephone is disclosed, comprising at least one cap which, in order to form at least one assigned key, is connected to a flexible carrier such that by pressing a key formed in this way, an input signal is generated. At least one mechanically stable fixing means is arranged between a first plane comprising at least the cap and a second plane of the flexible carrier connected to the cap, such that the cap is configured, with the flexible carrier, to transmit force in a substantially punctual manner through the plane of the fixing means and such that the fixing means is configured in one area of at least one terminal edge so as to secure the input device in or on a housing. The fixing means is enclosed in a form-locking manner between cap and carrier, thereby ensuring, within the limits necessary for key actuation, mobility of the cap as the actuator in a user interface.

Under the embodiment, the mechanically stable fixing means discussed above is fashioned as a metal sheet. The metal sheet is preferably fashioned as a lattice with recesses in the form of punched holes through which the individual keys can move in a direction of actuation within the limits necessary for triggering a signal. Based upon the target of a mechanically sufficiently stable fixing means which can safely be represented in the form of a metal lattice, very large recesses can also be selected so that in particular very good or substantially complete illumination of the respective key caps is possible.

In a preferred embodiment, a cap is molded onto the flexible carrier especially as the result of a thermoplastic molding and/or remolding process, after the fixing means has been assembled with the flexible carrier. In the area of the user interface, perpendicular to a direction of actuation, the cap has in at least one spatial direction a dimension which is greater than an opening in the fixing means. The cap preferably has at least in one sectional plane parallel to the direction of actuation an approximately mushroom-like cross-sectional form. Under the embodiment, the flexible carrier protruding through a recess of the fixing means at least in one area of a key then forms with the fixing means an indivisible module. Thus, in addition to improved handling through enlargement of the cap in contact with a finger of a user, this also achieves the outcome that the cap, in the event of excessive force being used during signal input, cannot get stuck or be pressed in permanently through a recess in the fixing means. In interaction with the fixing means, the cap functions limit movement in the direction of actuation, as a result.

In another exemplary embodiment, in place of the at least one key and the flexible carrier from one material, a multi-part and in particular multi-material design is provided. Here, the caps are manufactured as individual parts from, in particular, a translucent material and are connected to the flexible carrier. The materials can thus be optimally selected according to their respective intended application, i.e. the cap in terms of good and long-term wear-resistant pressability coupled simultaneously with good illumination, and the flexible carrier in terms of good long-term flexibility under continuous loading with no major tendency to crack or wear and also good dirt-resistance.

The at least one cap is preferably fixed to and/or on a projection of the flexible carrier. Here, on the other hand, all known methods of bonding, welding and/or positive coupling with or without thermal treatment, as well as combinations thereof, can be used.

In the embodiments described previously, it is thus ensured that a cap or key of the input device is secured against springing out in the direction of an actuation movement and in the direction opposing such an actuation movement.

Depending on the embodiment concerned, either the caps on an operable exterior or user interface, said caps overlapping the respective recesses, protrude through the recesses, or else projections or similar of the flexible carrier protrude through the recesses in the stable fixing means and are covered by the respective caps, to function as keys without support frames. The keys are thus fixed securely in a respective housing against the direction of actuation of each key.

In an alternate embodiment, at least one terminal edge of the fixing means is configured, for securing the input device in or on a housing, as a type of overlapping periphery and/or flange, this preferably being two respectively opposing terminal edges of the fixing means. These areas can largely be shaped freely without influencing the actual input device.

In yet another exemplary embodiment, fixing means are fashioned as protection against electrostatic discharge or as ESD protection. To this end, the fixing means is connected as an electrically conductive element internally in the housing to a grounding conductor, for example through a clamping contact which is produced automatically in the course of assembling the housing with the input device. This ensures leakage of ESD sparks.

In situations, where the span widths or opening widths of a housing aperture are small, a fixing means is inserted loosely into the respective housing. Where the span widths are larger, however, the fixing means is preferably connected to the housing rigidly or in one piece as a sheet-metal part. In one embodiment, the fixing means and an associated housing part are also fashioned from one material and produced in one piece in an essentially joint production step.

As can be appreciated by those skilled in the art, a production method disclosed herein creates a facility for fixing to, or in, a housing an input device which can be simply and reliably fixed, whereby the input device as a whole lies freely movable in two spatial axes in a housing and is firmly held back by the fixing means as a backing sheet in the housing without additional bonding or other connecting technologies. The input device may be centered relative to the housing by means of recesses in the fixing means, protruding through which the respective keys without support frames are fashioned. This has a beneficial effect on a chain of tolerance within the overall device, since no overdefined systems are formed as a result.

As well as a two-dimensional form, a three-dimensional form of a keypad surface can also be mechanically supported or even implemented here. This is brought about for example by bending the fixing means in an appropriately stable housing or by punching and bending the fixing means during its manufacture.

In addition, electrostatically discharging properties of a keypad disclosed herein can be utilized at no additional cost. Where the actual device housing is equipped appropriately, an input device according to the invention can also be used to configure a closed Faraday cage.

Furthermore, as an ancillary effect, a visible metallic reflection of the sheet-metal lattice can be used, at least in the key interspaces, for design purposes. By means of a surface treatment of the sheet-metal lattice, for example through anodization and/or inking, this effect can be used over the whole range of color design options, as described in detail below with reference to the representation of the drawings.

A fixing means may also replace a missing housing support frame, flanges or similar which otherwise normally anchor keys of an input device securely in a respective housing.

BRIEF DESCRIPTION OF THE DRAWINGS

The various objects, advantages and novel features of the present disclosure will be more readily apprehended from the following Detailed Description when read in conjunction with the enclosed drawings, in which.

DETAILED DESCRIPTION

Figure 1:
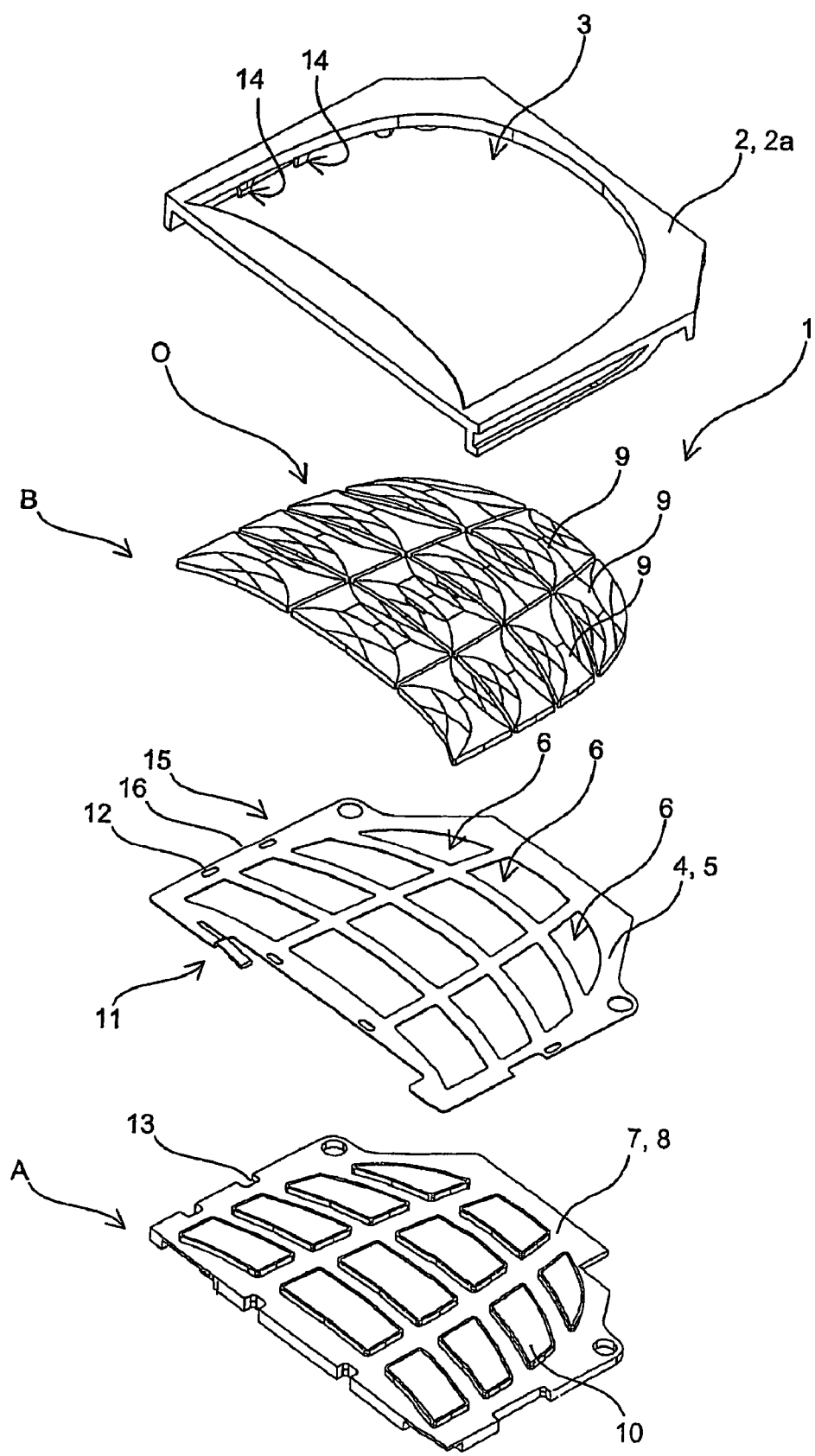
FIG. 1 shows a three-dimensional exploded diagram of an embodiment of an input device according to the invention.
Figure 2:
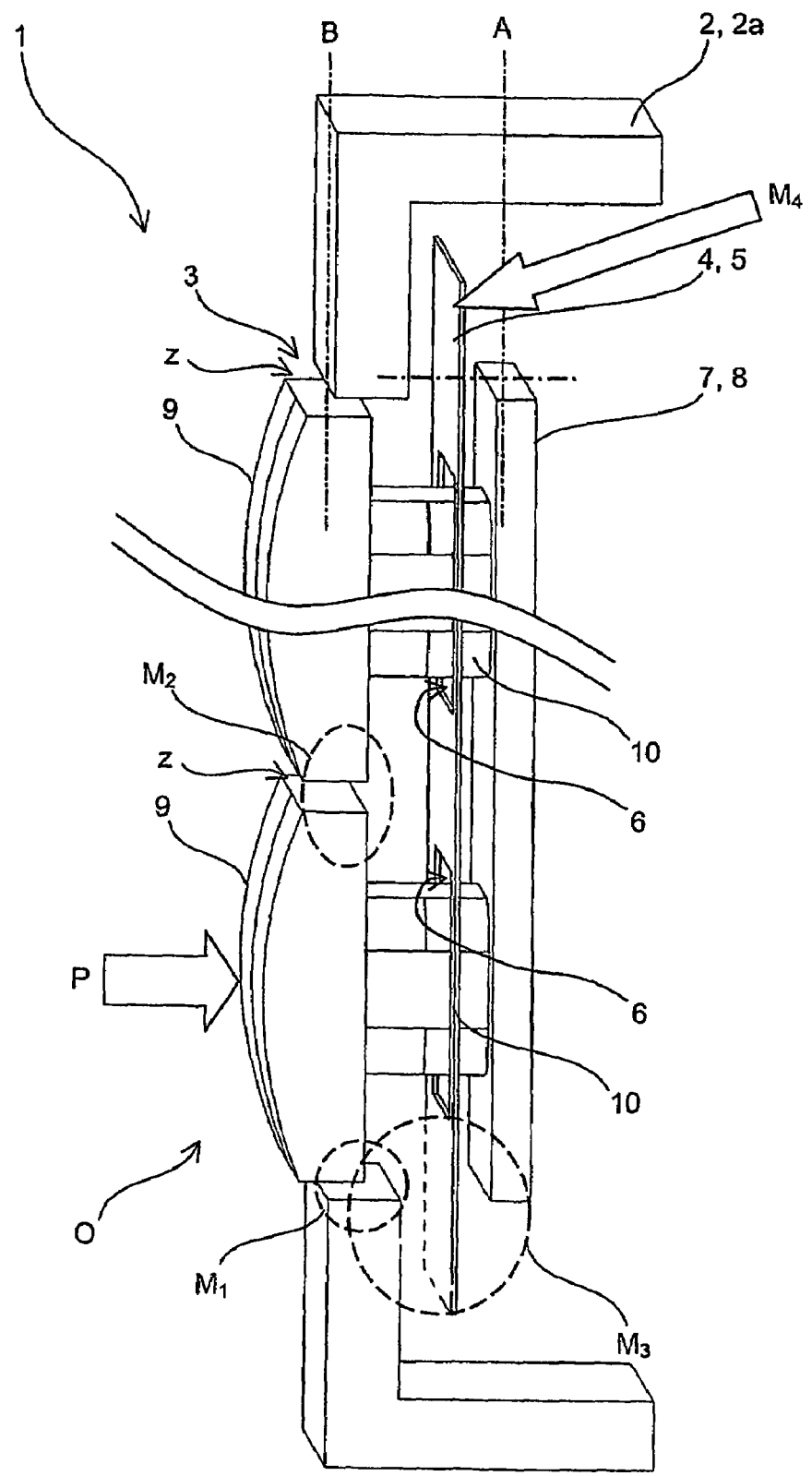
FIG. 2 represents a sectional diagram of the input device from FIG. 1.

Under the embodiments discussed in FIGS. 1 and 2, elements having the same function and mode of operation are in each case labeled with the same reference characters throughout.

The three-dimensional exploded diagram in FIG. 1 represents a diagrammatic assembly of an input device 1 as a keypad 1a for a mobile radiotelephone. In order to fashion a secure anchoring of the keypad 1*a* in a housing component 2, in this case an upper shell 2*a* of a housing which is not shown further here or of a housing aperture 3, a mechanically stable fixing means 4 is arranged in the form of a punched-out metal lattice 5 with recesses 6 between or in the transition of a plane A of a flexible carrier 7 in the form of a carrier mat 8 and a plane B with individual key caps 9.

In order to fashion an input device 1 having keys without support frames, projections 10 of the flexible carrier 7 protrude through respective recesses 6 in the stable fixing means 4 and are covered by the respective caps 9. The keys are thus securely locked in a respective housing against an actuation direction P of each key.

As well as using a capacity of the fixing means 4 to withstand high mechanical loads, secondary use is also made of its metallically conductive property in that the fixing means 4 is deployed as a protective device against electrostatic discharges. To this end, an ESD terminal 11 is fashioned as a punched and bent part on the fixing means 4. In an assembled condition, this ESD terminal 11 is connected to a grounding lead of the internal electronics through the action of the contact pressure of the upper part of the housing when locked to the remaining housing of the mobile telephone.

Furthermore, recesses 12 are provided on the fixing means 4 and corresponding comparatively flat notches 13 are provided in the flexible carrier 7. Due to the higher mechanical performance capability of the metal sheet, the fixing means 4 alone can ensure, via the recesses 12 in interaction with lugs 14 of the upper shell 2*a* of the housing, an adequate fixing inside the housing. A corresponding flange and overlap area would have been too small in size for the flexible carrier to assume the same function, so that it no longer has to be used for this purpose at all. Accordingly, only flat notches 14 are provided here simply to facilitate positioning during assembly.

In order to fashion an input device 1 in the form of a complete module, a printed circuit board for configuring electrical N/O contacts can be arranged in a known manner below the flexible carrier mat 7 with switching contacts (not shown in detail). This printed circuit board can also be connected to the flexible carrier mat 7 in one piece. However, this design of a finished input device as a one-piece module also behaves, in terms of positioning relative to the housing aperture 3 or the housing opening for the input keypad and its fixing in a predefined location, in the same way as an arrangement shown in FIG. 1 and consisting simply of the flexible carrier mat 7 with the individual key caps 9 fixed thereto.

Details will therefore be given, with reference to the sectional diagram in FIG. 2, of this type of positioning and fixing effected by the fixing means 4, in contrast to the prior art. For this purpose, the diagram in FIG. 2 has been represented in abbreviated form as a section along a plane A-A from FIG. 1. The three points at which securing measures according to the prior art are taken are marked by circles drawn in dashed lines: M1 indicates the position in which a flange on the cap 9 has extended below in the area of the housing aperture 3 of the upper shell 2*a* for securing purposes. M2 indicates a position fastening by a flange fashioned similarly to M1 between adjacent caps 9. M3 shows a current fixing of a known input device 1 by a flange in the area of the flexible carrier 7. The embodiment is more clearly illustrated in the representation of FIG. 2 in the area M3 by the dashed superimposition of a flange 16 in a terminal area 17 of the mechanically stable fixing means 4: in a direction P of a respective key movement or actuation direction, the flexible carrier 7 with key caps 9 fixed on the respective projections 10 of the flexible carrier 7 is freely movable to a sufficient degree, while the flexible carrier 7 is held and allowed only very limited movement in a plane perpendicular to the direction of actuation P by the respective recesses 6 in the stable fixing means 4.

In order to secure and to prevent a pulling out of the input device 1 through the terminal area 3 and at the same time to effect automatic fixing of its position, at least one terminal edge of the fixing means 4 is, in order to secure the input device 1 in or on a housing 2, fashioned as a type of overlapping periphery 18 and/or flange 16 in the terminal area 17 of the mechanically stable fixing means 4. As shown in the sketch in FIG. 2, these are preferably two respectively opposing terminal edges 19 of the fixing means 4.

In this way, at least in the area of mobile telephones, by loosely inserting a fixing means 4 in the form of a punched sheet-metal lattice 5 between key caps and flexible carrier material on a plane lying deeper in a respective housing 2, forms of retaining support frames can be implemented, by means of which an arrangement without support frames of the actual keys in the form of caps on a user interface 0 is possible. It should be appreciated that, while the embodiments disclose sheet-metal, other types of materials may be used without deviating from the spirit and scope of the invention.

As a special feature, the fixing means 4 in the form of a punched sheet-metal lattice 5 generates in interspaces z between the individual key caps 9 or between the key caps 9 and the adjacent upper shell 2*a* of the housing by virtue of its metal polish a special optical effect which, depending on the surface shape of the sheet-metal lattice 5, can be configured to fit an overall design concept, for example through coloring, etc. The resulting interspaces z between the caps 9 and/or a housing part are used without incurring additional expense in terms of metal optics or other design aspects.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The following reference characters and abbreviations, in particular, have been used within the scope of the present description of embodiments of the invention:

1 input device
1*a* keypad
2 housing part
2*a* upper shell of a housing
3 housing aperture
4 mechanically stable fixing means
5 metal lattice
6 recess in 4,5
7 flexible carrier
8 carrier mat
9 key cap
10 projection on 7,8
11 ESD terminal on 4,5
12 recess in 4
13 notch in 7
14 stud in 2*a*
15 terminal edge of 4,5
16 flange on 4,5
17 terminal area of 4,5
18 overlapping periphery of 4,5
19
A plane of flexible carrier 7
B plane with individual key caps 9
M1 . . . M4 areas of fixing measures P direction of a key movement/actuation direction
O user interface
SMS short message service
z interspace

The invention claimed is:

1. An input device, comprising:
   a flexible carrier;
   at least one cap connected to a top surface of the flexible carrier, wherein the cap is movable when force is applied to a surface of the cap; and
   at least one fixing means, arranged beneath a first plane that includes the at least one cap, and above a second plane of the flexible carrier connected to the cap, wherein the at least one cap, and the flexible carrier, is configured in such a way that the force can be transmitted in a substantially punctual manner through a plane that includes the fixing means and wherein the fixing means, in one area of at least one terminal edge, secures the input device in or on a housing.

2. An input device according to claim 1, wherein the fixing means comprises a metal sheet.

3. An input device according to claim 1, wherein the fixing means is configured as a lattice with recesses, through which the at least one cap can move in a direction of actuation.

4. An input device according to claim 3, further comprising at least one projection on the flexible carrier, wherein said at least one projection are configured to protrudes through the recesses in the stable fixing means and is covered by a respective at least one cap fixed on the projection.

5. An input device according to claim 1, wherein the at least one cap has, perpendicular to a direction of actuation in at least one spatial direction, a dimension that is greater than an opening in the fixing means.

6. An input device according to claim 1, wherein the cap is configured on an operable exterior or user interface to project over the respective recess and to protrude through the recesses.

7. An input device according to claim 1, wherein the cap has, at least in one sectional plane parallel to the direction of actuation, an approximately mushroom-like cross-sectional form.

8. An input device according to claim 1 wherein at least one terminal edge of the fixing means is configured as a type of overlapping periphery and/or flange for securing the input device in or on a housing.

9. An input device according to claim 1, wherein two respectively opposing terminal edges of the fixing means are configured as a type of overlapping periphery and/or flange.

10. An input device according to claim 1, wherein fixing means is inserted loosely into the respective housing, especially where the span widths or opening widths of a housing aperture or of a keyboard opening are small.

11. An input device according to claim 1, wherein the fixing means is connected to the housing rigidly and/or in one piece, whereby the fixing means is preferably configured as a punched and bent sheet-metal part.

12. An input device according to claim 1, wherein the fixing means and an associated housing part are configured from one material and are manufactured in one piece in an essentially joint production step.

13. An input device according to claim 1, wherein the fixing means forms a three-dimensional keypad surface or user interface.

14. An input device according to claim 1, wherein the fixing means is configured as an ESD protection.

15. Input device according to claim 1, wherein the input device is one of a mobile telephonic device and mobile computing device.

* * * * *